US008032739B2

United States Patent
Ramos et al.

(10) Patent No.: US 8,032,739 B2
(45) Date of Patent: Oct. 4, 2011

(54) MANUFACTURING INFORMATION HANDLING SYSTEMS

(75) Inventors: Alberto Ramos, Limerick (IE); Alex Paul Tips, Cork (IE); Roy Meaney, Limerick (IE)

(73) Assignee: Dell Products L.P., Round Rock, TX (US)

( * ) Notice: Subject to any disclaimer, the term of this patent is extended or adjusted under 35 U.S.C. 154(b) by 708 days.

(21) Appl. No.: 12/102,331

(22) Filed: Apr. 14, 2008

(65) Prior Publication Data

US 2009/0259834 A1 Oct. 15, 2009

(51) Int. Cl.
*G06F 9/24* (2006.01)
*G06F 15/177* (2006.01)

(52) U.S. Cl. ............... 713/1; 713/2; 713/100; 718/1; 726/1

(58) Field of Classification Search .............. 713/1, 2, 713/100; 718/1; 726/1
See application file for complete search history.

(56) References Cited

U.S. PATENT DOCUMENTS

| 6,543,047 B1 | 4/2003 | Vrhel, Jr. et al. |
| 6,907,604 B1 | 6/2005 | Macnair, Jr. et al. |
| 7,159,106 B2 | 1/2007 | Meaney et al. |
| 2005/0165653 A1 | 7/2005 | Meaney et al. |
| 2006/0112416 A1* | 5/2006 | Ohta et al. ............ 726/1 |
| 2006/0224816 A1* | 10/2006 | Yamada et al. ............ 711/6 |
| 2009/0064132 A1* | 3/2009 | Suchy et al. ............ 717/177 |
| 2009/0144725 A1 | 6/2009 | Vrhel, Jr. |
| 2009/0228883 A1* | 9/2009 | Gebhart et al. ............ 718/1 |

* cited by examiner

*Primary Examiner* — Thomas Lee
*Assistant Examiner* — Michael J Brown
(74) *Attorney, Agent, or Firm* — Haynes and Boone, LLP (57) ABSTRACT

Manufacturing a virtual information handling system (IHS) includes creating a virtual IHS including a component identifier. A boot process is then started for the virtual IHS. A manufacturing operating system is retrieved for the virtual IHS using the component identifier. The manufacturing operating system is installed on the virtual IHS. Manufacturing a virtual IHS may also include determining a common operating system and a common software subset among a plurality of to-be-manufactured virtual IHSs. A first virtual IHS may be created and the common operating system may be configured on the first virtual IHS. At least a portion of a first virtual IHS software may also be configured on the first virtual IHS. The configuration of the first virtual IHS software on the first virtual IHS is stopped when the common software subset is configured on the first virtual IHS. The first virtual IHS may then be cloned to create a cloned virtual IHS.

19 Claims, 3 Drawing Sheets

MANUFACTURING INFORMATION HANDLING SYSTEMS

BACKGROUND

The present disclosure relates generally to information handling systems, and more particularly to the manufacturing of information handling systems.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

For manufacturers of IHSs and/or virtual IHSs, it is desirable to provide customers the ability to configure the hardware, virtual hardware, and/or software for the systems to the specifications of the customer. In order to increase efficiency of the manufacture of the systems, it may be desirable to automate as much of the manufacturing process as possible and/or eliminate duplicative steps in the manufacture of similar systems.

Conventionally, in the area of IHSs, processes have been implemented to automate and customize the initial boot process of IHSs. However, it is still necessary that a system identifier, or "System Trackcode", along with the serial numbers of hardware in the system, be entered into a database prior to the assembly of the system. The entering of such information into a database is a manual process, typically accomplished by barcode scanning, that slows down manufacture times and raises costs.

Accordingly, it would be desirable to provide for improved manufacturing of IHSs.

SUMMARY

According to one embodiment, a method for manufacturing a virtual IHS includes creating a virtual IHS comprising a component identifier, starting a boot process for the virtual IHS, retrieving a manufacturing operating system for the virtual IHS using the component identifier, and installing the manufacturing operating system on the virtual IHS. The method may also include determining a common operating system and a common software subset among a plurality of to-be-manufactured virtual IHSs, creating a first virtual IHS, configuring the common operating system on the first virtual IHS, configuring at least a portion of a first virtual IHS software on the first virtual IHS, stopping the configuration of the first virtual IHS software on the first virtual IHS when the common software subset is configured on the first virtual IHS, and cloning the first virtual IHS to create a cloned virtual IHS.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
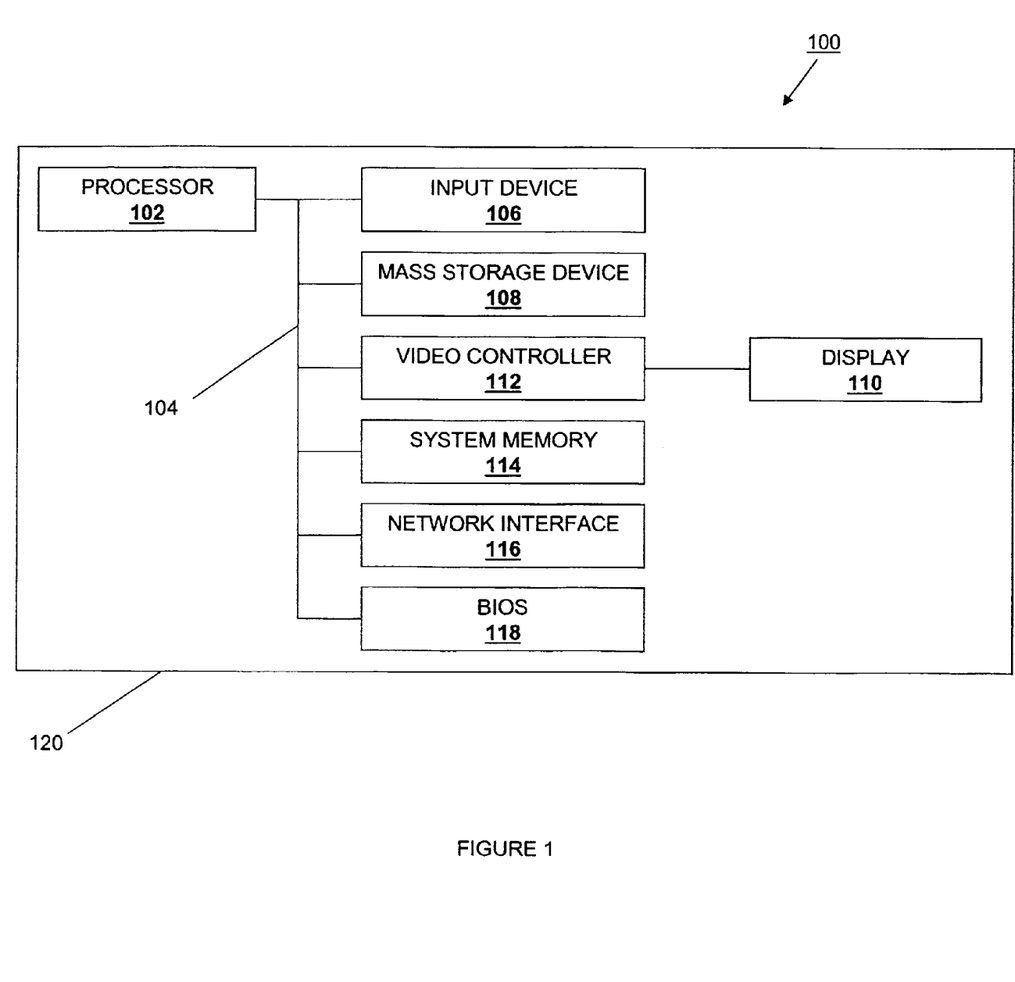
FIG. 1 is a schematic view illustrating an embodiment of an IHS.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, network attached storage (NAS) devices, storage area network (SAN) devices, internet Small Computer System Interface (iSCSI) devices, ramdisk devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. A network interface 116 is coupled to processor 102 and may provide, for example, a communications link between devices outside the IHS 100 and components of the IHS 100, and/or perform other network interface functions known in the art. A basic input/output system (BIOS) 118 is coupled to processor 102 and may, for example, identify and initiate hardware components upon the startup of the IHS 100, and/or perform other BIOS functions known in the art. In an embodiment, a chassis 120 houses some or all of the components of IHS 100. However, in an embodiment, components such as, for example, the mass storage device 108, may be coupled to the IHS 100 via an I/O device such as, for example, a Fiber-Channel Host Bus Adapter (HBA), IP networks such as iSCSI, and/or a variety of other devices known in the art. It should be understood that other buses and intermediate circuits can be deployed between the components described above and processor 102 to facilitate interconnection between the components and the processor 102.

In an embodiment, the IHS 100 may include a virtual IHS and/or a plurality of virtual IHSs, some of which may be identical to each other with regard to, for example, virtual hardware and/or software on the virtual IHSs, and some of which may be different from each other with regard to, for example, virtual hardware and/or software on the virtual IHSs. In an embodiment, a virtual IHS is a software implementation of a physical IHS that executes programs like the physical IHS. For example, a virtualization layer may be installed on the IHS 100 that allows multiple operating systems to run concurrently within virtual IHSs on the IHS 100, dynamically partitioning and sharing the available physical resources of the IHS 100 such as, for example, the CPU, storage, memory, input/output devices, and/or a variety of other resources known in the art. In an embodiment, while the virtual IHS runs on the IHS 100, it behaves as though it were a separate IHS. A customer may purchase the IHS 100 and request that a plurality of virtual IHSs be manufactured on the IHS 100, and some or all of the virtual IHSs may require manufacturing according to a plurality of different customer specifications that are different due to, for example, different software (e.g. operating systems, applications, etc.) being specified on different virtual IHSs. In an embodiment, a plurality of virtual IHSs may be different from each other with regard to operating system configuration information such as, for example, IHS name, user accounts, network settings, etc., even though the plurality of virtual IHSs are identical in every other respect. In an embodiment, the IHS 100 may be, for example, a server or similar IHS known in the art, and may be shipped to and physically possessed by the customer, or may be set up to allow customer access remotely using methods known in the art.

Figure 2:
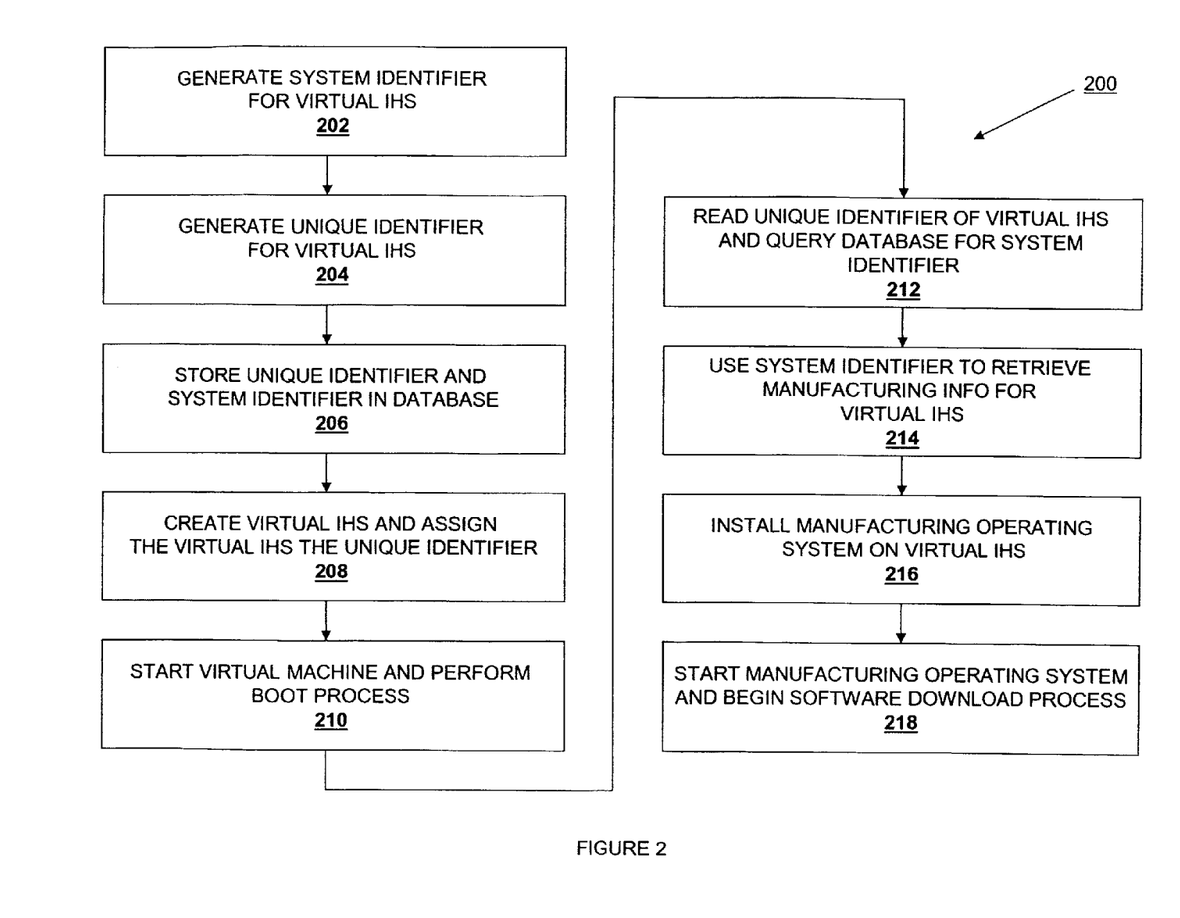
FIG. 2 is a flow chart illustrating an embodiment of a method for manufacturing a virtual IHS.

Referring now to FIG. 2, a method 200 for manufacturing a virtual IHS is illustrated. The method 200 begins at block 202 where a system identifier is generated for a virtual IHS. An order for one or more virtual IHSs may be received from a customer, and a system identifier, which also may be referred to as a "system trackcode", is generated for each virtual IHS. In an embodiment, the system identifier defines the virtual hardware and software configuration of the virtual IHS for which it was generated. In an embodiment, the system identifier may also be used to define some unique configuration information for the virtual IHS such as, for example, an IHS name, a user name, network settings, software license information, and/or a variety of other information known in the art. The method 200 then proceeds to block 204 where a component identifier is generated for the virtual IHS. For each virtual IHS ordered, a component identifier is generated. In an embodiment, the component identifier may include, for example, a Media Access Control (MAC) address, a universally unique identifier (UUID), and/or a variety of other component identifiers known in the art that may be programmed into the virtual IHS (e.g., in a component of the virtual IHS) as the virtual IHS is being created and then later read programmatically (e.g., via software running on the virtual IHS). In an embodiment, the component identifier may be generated by, for example, selecting the component identifier from a group of available identifiers, using a software algorithm to create the component identifier, selecting the component identifier from a list of identifiers supplied by the customer, combinations thereof, and/or a variety of other component identifier generating techniques known in the art. The rest of the method 200 will be described as it relates to a single virtual IHS for which a system identifier and component identifier have been generated, but one of skill in the art will recognize that the method 200 may be applied to any plurality of virtual IHSs.

The method 200 then proceeds to block 206 where the system identifier generated in block 202 and the component identifier generated in block 204 are stored in a database. The system identifier and component identifier for the virtual IHS are stored in a database and may be linked in order to tie the component identifier to the system identifier such that the component identifier may be used to find the system identifier later in the method 200, as described in further detail below. In an embodiment, the component identifier and the system identifier are created and linked prior to the creation of the virtual IHS for which they were generated. The method 200 then proceeds to block 208 where the virtual IHS is created and assigned the component identifier. The virtual IHS is created according to the customers specifications by, for example, using an Application Programming Interface (API) and/or other methods known in the art. In an embodiment, the virtual IHS includes a plurality of virtual storage devices such as, for example, a virtual hard drive, a virtual RAM, and/or a variety of other virtual storages devices known in the art. In an embodiment, the virtual storage is empty upon the creation of the virtual IHS. In an embodiment, the virtual IHS includes a virtual Network Interface Card (NIC). In an embodiment, the virtual NIC is assigned the component identifier generated in block 204 by, for example, assigning the component identifier as a MAC address to the virtual NIC. In an embodiment, the virtual IHS includes a BIOS. In an embodiment, the component identifier may be a UUID and may be programmed into the BIOS of the virtual IHS and stored, for example, in the system management BIOS (SMBIOS) system information descriptor. While a number of examples of assigning the component identifier to the virtual IHS have been described, one of skill in the art will recognize other methods to assign the component identifier to the virtual IHS that fall within the scope of the present disclosure.

The method 200 then proceeds to block 210 where the virtual IHS is started and a boot process is run. In an embodiment, the boot process includes a pre-boot execution environment (PXE) boot and universal PXE boot process that are described in more detail in U.S. Pat. No. 7,159,106 and U.S. Patent Application No. 2005/0165653, the disclosures of which are incorporated herein by reference. However, the universal PXE boot process described in those patent documents depends on the system identifier/trackcode and the hardware serial numbers for the components of the physical IHS being scanned and entered into a database prior to the system being assembled, slowing down the process and increasing its cost. In the present disclosure, this step is eliminated by the generation of the component identifier, as described in further detail below.

The method 200 then proceeds to block 212 where the component identifier is read from the virtual IHS and a database is queried for the system identifier. In an embodiment, as part of the universal PXE boot process, the component identifier is read from the virtual IHS. The database in which the component identifier and system identifier were stored in block 206 is then queried for the system identifier. In an embodiment, the MAC address of the virtual NIC is read and used to query the database for the system identifier. In an embodiment, the UUID may be accessed, for example, by conventional SMBIOS scanning software, and used to query the database for the system identifier. In an embodiment, a variety of different software running on the virtual IHS may be used to read the component identifier from the virtual IHS and then use that component identifier to determine the system identity using the system identifier. In an embodiment, the use of the component identifier on the virtual IHS to determine the system identity using the system identifier makes the software installation process, described in further detail below, independent of the virtualization platform being used.

The method 200 then proceeds to block 214 where the system identifier is used to retrieve manufacturing information for the virtual IHS. In an embodiment, as part of the universal PXE boot process, the system identifier determined in block 212 is used to retrieve the manufacturing information for the virtual IHS. In an embodiment, the manufacturing information includes a plurality of customer-ordered software, which may also be referred to as a Software Descriptor Record, to be installed on the virtual IHS. In an embodiment, the manufacturing information also includes the manufacturing operating system.

The method 200 then proceeds to block 216 where the manufacturing operating system is installed on the virtual IHS. In an embodiment, as part of the universal PXE boot process, the manufacturing operating system is installed on the virtual storage of the virtual IHS. In an embodiment, the virtual storage of the virtual IHS is a virtual RAM of the virtual IHS. In an embodiment, the installation of the manufacturing operating system on the virtual RAM of the virtual IHS allows the configuration and partition of the virtual hard drive as needed, prior to copying a customer operating system to the virtual IHS.

The method 200 then proceeds to block 218 where the manufacturing operating system is started and a software download process is begun. In an embodiment, the software download process includes two parts: 1) a download phase in which a customer operating system and software applications are copied to an IHS, and 2) a system setup phase in which the customer operating system is configured and the software applications are installed or integrated into the customer operating system. In an embodiment, the download phase runs under a manufacturing operating system and the system setup phase runs under the customer operating system. In an embodiment, the system setup phase is the most time-consuming part of the software download process. Examples of software download processes include those described in U.S. Pat. Nos. 6,543,047 and 6,907,604, the disclosures of which are incorporated by reference. However, the software download process of the present disclosure is enhanced from such previous methods in that the process may be halted at any point within each phase and, in and embodiment, the virtual IHS may be shut down. Upon start up of that virtual IHS, the software download process will then resume and continue from the point at which it was interrupted, as will be described in further detail below.

In an embodiment, as part of the universal PXE process, the manufacturing operating system is started. Once the manufacturing operating system has started, the virtual IHS may then run a software download process in which a customer operating system and customer applications for the virtual IHS may be retrieved and installed on the virtual IHS. In an embodiment, the customer operating system and customer applications may be copied to the virtual hard drive. Thus, an automated, build-to-order method is described that allows the booting of a virtual IHS and the installation of a plurality of unique software, including an operating system and applications, on that virtual IHS without the need for costly and time-consuming manual processes. While the method 200 has been described for virtual IHSs, one of skill in the art will recognize that it may be performed for physical IHSs without departing from the scope of the present disclosure by, for example, replacing the virtual IHS and its virtual components with their physical counterparts.

Figure 3:
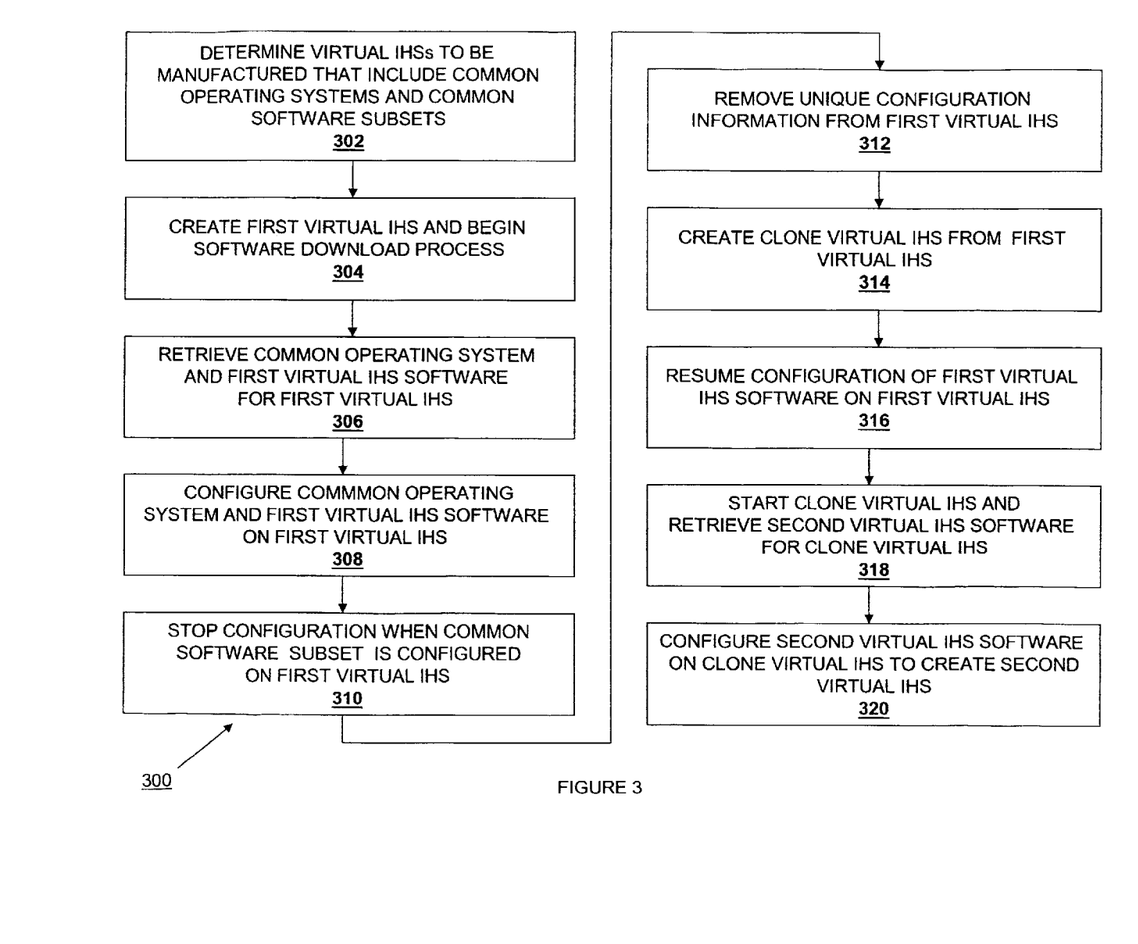
FIG. 3 is a flow chart illustrating an embodiment of a method for manufacturing a plurality of virtual IHSs.

Referring now to FIG. 3, a method 300 for manufacturing a plurality of virtual IHSs is illustrated. As will be described in further detail below, and as will be recognized by those of skill in the art, the method 300 may be used either by itself or in combination with the method 200 to quickly and efficiently manufacture virtual IHSs. In an embodiment, the method 300 may begin after block 218 of the method 200. The method 300 begins at block 302 where a common operating system and common software subset are determined for a plurality of to-be-manufactured IHSs. As described above, a customer may purchase the IHS 100 and request that a plurality of virtual IHSs be manufactured on the IHS 100. In an embodiment, a plurality of customers may purchase a plurality of IHSs 100 and request that a plurality of virtual IHSs be manufactured on the IHSs 100. In an embodiment, some or all of the virtual IHSs may require manufacturing according to a plurality of different customer specifications that are different due to, for example, different software (e.g. operating systems, applications, etc.) being specified on different virtual IHSs. In an embodiment, blocks 202-208 of the method 200 may be performed for each virtual IHS ordered (e.g., a unique component identifier and a unique system identifier may be created for each virtual IHS and then linked and stored within a database, as described above). The plurality of virtual IHSs may be analyzed to determine a group of to-be-manufactured virtual IHSs that have all been specified to be manufactured with a common operating system and a common software subset. In an embodiment, a common software subset may be a software application that is to be installed on each of the virtual IHSs in a to-be-manufactured virtual IHS group, a plurality of software applications that are each to be installed on each of the virtual IHSs in a to-be-manufactured virtual IHS group, and/or a variety of other common software subsets known in the art. In an embodiment, the software descriptor records of each virtual IHS ordered by a customer or customers are examined to determine the common operating system and common software subset.

The method 300 then proceeds to block 304 where a first virtual IHS is created and a software download process is begun. In an embodiment, block 304 of the method 300 may be replaced by the method 200 in order to create/manufacture the first virtual IHS. In an embodiment, the first virtual IHS may be created using methods known in the art. Once the first virtual IHS is created, a software download process is begun to install the operating system and applications specified for the first virtual IHS. The method 300 then proceeds to block 306 where the common operating system, determined in block 302 of the method 300, and a first virtual IHS software for the first virtual IHS are retrieved. In an embodiment, the first virtual IHS software includes the software selected by the customer during the ordering process to be installed on at least one of the virtual IHSs. In an embodiment, the common operating system and the first virtual IHS software for the first virtual IHS are copied to the virtual storage such as, for example, the virtual hard drive, of the first virtual IHS.

The method 300 then proceeds to block 308 where the common operating system and the first virtual IHS software are configured on the first virtual IHS. In an embodiment, the common operating system is configured on the first virtual IHS and the first virtual IHS software is either partially or completely configured on the first virtual IHS, depending on the common software subset determined in block 302 of the method 300. The method 300 then proceeds to block 310 where the configuration of the first virtual IHS software is stopped when the common software subset, determined in block 302, has been configured. For example, if the common software subset includes the entirety of the first virtual IHS software, then the first virtual IHS software is completely configured on the first virtual IHS and the configuration is stopped when that process is complete. In another example, if the common software subset includes only a portion of the first virtual IHS software, then the first virtual IHS software is partially configured on the first virtual IHS and the configuration is stopped when configuration of the first virtual IHS software is at a point where only the common software subset portion of the first virtual IHS software has been configured on the first virtual IHS.

The method 300 then proceeds to block 312 where unique operating system software configuration information is removed from the first virtual IHS. In an embodiment, any operating system software configuration information that is unique to the first virtual IHS such as, for example, the Internet Protocol (IP) address of the first virtual IHS, the system name of the first virtual IHS, and/or a variety of other operating system software configuration information known in the art, is removed from the first virtual IHS using tools known in the art such as, for example, the Sysprep utility for MICROSOFT WINDOWS®. In an embodiment, after the removal of the unique operating system software configuration information from the first virtual IHS, the first virtual IHS is shut down.

The method 300 then proceeds to block 314 where a clone virtual IHS is created from the first virtual IHS. The first virtual IHS may be cloned to create a clone virtual IHS having the common operating system and the common software subset that were configured on the first virtual IHS in block 308. Cloning the first virtual IHS involves copying all of the state information of the first virtual IHS, including the virtual storage (e.g., the virtual hard disk), in order to make a replica, or clone, of the first virtual IHS. Cloning the first virtual IHS at block 314 of the method 300, after the common operating system and common software subset have been configured on the first virtual IHS, creates the clone virtual IHS that, upon its creation, includes the common operating system and common software subset without the need to spend the time necessary to retrieve and configure the common operating system and common software subset on that virtual IHS. In an embodiment, there may be a plurality of to-be-manufactured virtual IHSs that include the common operating system and common software subset, and a plurality of clone virtual IHSs may be created from the first virtual IHS in order to bypass the need to retrieve and configure the common operating system and common software subset on those virtual IHSs. In an embodiment, after cloning, the clone virtual IHS (or plurality of cloned virtual IHSs) may be modified programmatically such that the virtual hardware on the cloned virtual IHS (or IHSs) is unique and different from the first virtual IHS. In an embodiment, the modification of the virtual hardware on the cloned virtual IHS (or IHSs) may occur while the software on the virtual hard drive of the cloned virtual IHS (or IHSs) remains the same. In an embodiment, the cloned virtual IHS (or IHSs) is programmed with its own component identifier such that, upon start up of the cloned virtual IHS (or IHSs), unique operating system software configuration information and/or software not already installed on the cloned virtual IHS may be downloaded and installed, as described in further detail below. In an embodiment, a new virtual IHS may be created, similarly as described above for the creation of the first virtual IHS, and then assigned a copy of the virtual hard disk file from the first virtual IHS. In an embodiment, a new virtual IHS may be created, similarly as described above for the creation of the first virtual IHS, and then the contents of the virtual hard disk file from the first virtual IHS may be copied to the empty virtual hard disk of the new virtual IHS.

The method 300 then proceeds to block 316 where the configuration of the first virtual IHS software is resumed. In an embodiment, the first virtual IHS was shut down in block 312 of the method 300, and is restarted and/or re-booted in block 316. In an embodiment, the unique configuration information removed from the first virtual IHS in block 312 is reapplied to the first virtual IHS by, for example, copying a SYSPREP.INI file in the relevant folder so that when the first virtual IHS starts up, the configuration settings are applied. In an embodiment, the first virtual IHS software was only partially configured in block 308 of the method 300, and upon booting the first virtual IHS, the configuration of the first virtual IHS software on the first virtual IHS continues from the point where the configuration was stopped upon the common software subset having been configured. In an embodiment, the first virtual IHS software was completely configured in block 308 of the method 300 and requires no additional software configuration. In an embodiment, the first virtual IHS may download additional software and configure that software.

The method 300 then proceeds to block 318 where the clone virtual IHS is started and a second virtual IHS software is retrieved for the clone virtual IHS. In an embodiment, software may be retrieved according to the method 200 (e.g., by performing blocks 210-218 in order to start a manufacturing operating system and download the software listed in a Software Descriptor Record that was not downloaded for the first virtual IHS. In an embodiment, the software downloaded may include unique operating systems software configuration information such as, for example, a SYSPREP.XML file, a SYSPREP.INI file, and or other operating systems software configuration information known in the art that is unique to that virtual IHS). In an embodiment, the second virtual IHS software includes the software selected by the customer during the ordering process to be installed on at least one of the virtual IHSs, but without the common software subset that was already configured on the first virtual IHS and that is included on the cloned virtual IHS due to the cloning performed in block 314. In an embodiment, the second virtual IHS software is copied to the virtual storage such as, for example, the virtual hard drive, of the clone virtual IHS. Thus, a reduced amount of software is required to be retrieved and/or copied to the clone virtual IHS. In an embodiment, a plurality of clone virtual IHSs may have been created in block 314 of the method 300, and a different virtual IHS software may have been selected by the customer or customers during the ordering process to be installed on each of the clone virtual IHSs. Those different virtual IHS software may be retrieved for their respective clone virtual IHSs and may be copied to the virtual storages of their respective clone virtual IHSs, as described above. In an embodiment, the second virtual IHS software may indicate that the clone virtual IHS includes software that was downloaded and/or configured in blocks 306 and 308 but was not selected to be included on that particular virtual IHS, and the software not selected for that particular IHS is deleted from the virtual hard drive of the cloned virtual IHS to create the second virtual IHS. The method 300 then proceeds to block 320 where the second virtual IHS software is configured on the clone virtual IHS to create a second virtual IHS. The clone virtual IHS configures the second virtual IHS software that includes only the software not configured on the first virtual IHS and included on the cloned virtual IHS due to the cloning performed in block 314, creating a second virtual IHS and thereby reducing the time needed to completely manufacture the second virtual IHS. In an embodiment, the clone virtual IHS reboots after retrieving the second virtual IHS software at block 318, starts the customer operating system, and then completes the configuration of the second virtual IHS software. In an embodiment, a plurality of cloned virtual IHSs may have their different virtual IHS software configured in the same manner as described above. Thus, a plurality of virtual IHSs having different software may be manufactured in a reduced time relative to conventional methods and without consuming the resources required by those conventional methods.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A method for manufacturing a virtual information handling system (IHS), comprising:
   generating a component identifier for the first virtual IHS;
   generating a system identifier for the first virtual IHS;
   linking and storing the component identifier and the system identifier in a database;
   creating the virtual IHS comprising the component identifier;
   starting a boot process for the virtual IHS;
   retrieving a manufacturing operating system for the virtual IHS using the component identifier; and
   installing the manufacturing operating system on the virtual IHS.

2. The method of claim 1, wherein the creating the virtual IHS comprises creating a virtual network information card (NIC) that is assigned the component identifier.

3. The method of claim 1, wherein the retrieving of the manufacturing operating system further comprises:
   reading the component identifier from the virtual IHS;
   querying the database for the system identifier using the component identifier; and
   retrieving the manufacturing operating system using the system identifier.

4. The method of clam 1, further comprising:
   installing a customer operating system on the virtual IHS.

5. The method of claim 4, further comprising:
   installing at least one customer application on the virtual IHS.

6. The method of claim 1, wherein the creating the virtual IHS comprises creating a virtual storage.

7. The method of claim 1, wherein the beginning the boot process for the virtual IHS comprises a virtual NIC performing a pre-boot execution environment (PXE) boot and the virtual IHS running a universal PXE boot process.

8. The method of claim 1, wherein the retrieving the manufacturing operating system for the virtual IHS using the component identifier further comprises:
   retrieving manufacturing information for the virtual IHS that comprises a plurality of software to be installed on the virtual IHS, wherein the manufacturing information includes the manufacturing operating system.

9. A method for manufacturing a plurality of virtual information handling systems (IHSs), comprising:
   generating a component identifier for the first virtual IHS;
   generating a system identifier for the virtual IHS;
   linking and storing the component identifier and the system identifier in a database;
   determining a common operating system and a common software subset among a plurality of to-be-manufactured virtual IHSs;
   creating the first virtual IHS comprising the component identifier;
   starting a boot process for the first virtual IHS;
   retrieving a manufacturing operating system for the first virtual IHS using the component identifier;
   installing and running the manufacturing operating system on the first virtual IHS;
   retrieving the common operating system and a first virtual IHS software for the first virtual IHS;
   configuring the common operating system on the first virtual IHS;
   configuring at least a portion of the first virtual IHS software on the first virtual IHS;
   stopping the configuration of the first virtual IHS software on the first virtual IHS when the common software subset is configured on the first virtual IHS; and
   cloning the first virtual IHS to create a cloned virtual IHS.

10. The method of claim 9, further comprising:
    completing the configuration of the first virtual IHS software on the first virtual IHS.

11. The method of claim 10, wherein the completing the configuration of the first virtual IHS software on the first virtual IHS comprises booting the first virtual IHS, wherein, upon boot, the configuration of the first virtual IHS software on the first virtual IHS continues from the point where the configuration was stopped upon the common software subset having been configured.

12. The method of claim 9, further comprising:
    configuring a second virtual IHS software on the clone virtual IHS to create a second virtual IHS.

13. The method of claim 12, further comprising:
    copying the second virtual IHS software to the clone virtual IHS.

14. The method of claim 9, further comprising:
    copying the common operating system and the first virtual IHS software to the first virtual IHS.

15. The method of claim 9, further comprising:
    removing unique operating system software configuration information from the first virtual IHS prior to the cloning of the first virtual IHS.

16. The method of claim 10, further comprising:
    receiving an order for the plurality of to-be-manufactured virtual IHSs.

17. The method of claim 9, further comprising:
    cloning the first virtual IHS to create a plurality of cloned virtual IHSs; and
    configuring a different virtual IHS software on each of the plurality of cloned virtual IHSs to create a plurality of different virtual IHSs.

18. A method for manufacturing a plurality of virtual information handling systems (IHSs), comprising:
    generating a component identifier for the first virtual IHS;
    generating a system identifier for the first virtual IHS;
    linking and storing the component identifier and the system identifier in a database;
    determining a common operating system and a common software subset among a plurality of to-be-manufactured virtual IHSs;
    creating the first virtual IHS comprising the component identifier;
    starting a boot process for the first virtual IHS;
    retrieving a manufacturing operating system for the first virtual IHS using the component identifier;

installing and running the manufacturing operating system on the virtual IHS;

retrieving the common operating system and a first virtual IHS software for the first virtual IHS;

configuring the common operating system on the first virtual IHS;

configuring at least a portion of the first virtual IHS software on the first virtual IHS;

stopping the configuration of the first virtual IHS software when the common software subset is configured on the first virtual IHS;

cloning the first virtual IHS to create a plurality of cloned virtual IHSs;

retrieving a second virtual IHS software for at least one of the plurality of cloned virtual IHSs; and configuring the second virtual IHS software on the at least one of the plurality of cloned virtual IHSs to create a second virtual IHS.

19. The method of claim 18, wherein the retrieving the manufacturing operating system further comprises:

reading the component identifier from the first virtual IHS;

querying the database for the system identifier using the component identifier; and retrieving the manufacturing operating system using the system identifier.

* * * * *

UNITED STATES PATENT AND TRADEMARK OFFICE
CERTIFICATE OF CORRECTION

| | | |
|---|---|---|
| PATENT NO. | : 8,032,739 B2 | Page 1 of 1 |
| APPLICATION NO. | : 12/102331 | |
| DATED | : October 4, 2011 | |
| INVENTOR(S) | : Alberto Ramos et al. | |

It is certified that error appears in the above-identified patent and that said Letters Patent is hereby corrected as shown below:

Column 9, line 23, in Claim 1 should read --generating a component identifier for a virtual IHS;--

Column 9, line 64, in Claim 9 should read --generating a component identifier for a virtual IHS;--

Column 10, line 56, in Claim 18 should read --generating a component identifier for a virtual IHS;--

Signed and Sealed this
Thirteenth Day of November, 2012

David J. Kappos
*Director of the United States Patent and Trademark Office*